A. SCHMID.
METHOD FOR TAPPING CASKS AND OTHER VESSELS.
APPLICATION FILED MAR. 16, 1915.

1,317,731.

Patented Oct. 7, 1919.

UNITED STATES PATENT OFFICE.

ARTHUR SCHMID, OF ZOLLIKON, NEAR ZURICH, SWITZERLAND.

METHOD FOR TAPPING CASKS AND OTHER VESSELS.

1,317,731.  Specification of Letters Patent.  Patented Oct. 7, 1919.

Application filed March 16, 1915. Serial No. 14,804.

*To all whom it may concern:*

Be it known that I, ARTHUR SCHMID, a citizen of the Republic of Switzerland, residing at Zollikon, near Zurich, in the Canton of Zurich, Republic of Switzerland, have invented certain new and useful Improvements in Methods for Tapping Casks with Decomposable Fluids and Sterile Retailing of Them without Infecting the Contents; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the invention is a method of tapping casks and other vessels that contain liquids, more especially such of a nonalcoholic character or liquids containing a low percentage of alcohol such as nonalcoholic fruit drinks, etc., in such a manner that infection is avoided or prevented by passing the tapping appliance partly through the disinfecting medium. In addition to the disinfecting medium another fluid or fluids may be used which are of such a nature and specific gravity as not to unite with either the disinfectant or the liquid contained in the vessel.

The invention will now be described with reference to the accompanying drawings which illustrate by way of example two forms of apparatus for carrying my method into practice, and in which.

Figure 1:
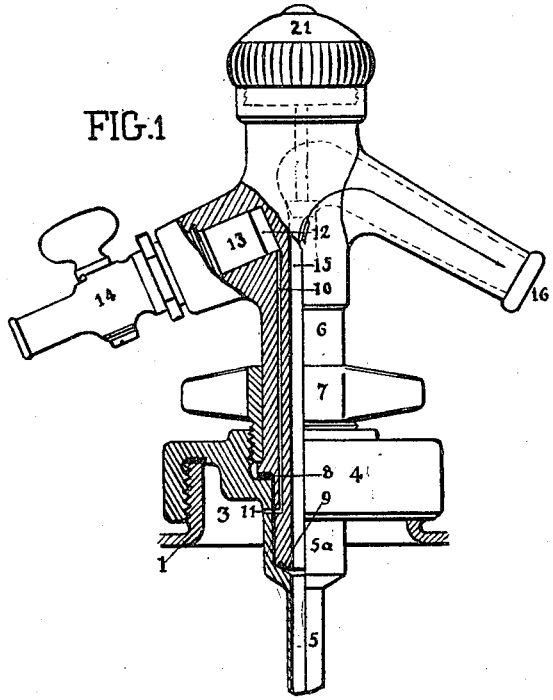
Figure 1 shows an elevation of the device partly in section and in operative position upon a vessel for tapping the contents.

In carrying the invention into practice, the portable vessel 1 (Fig. 1) has a threaded neck or any other suitable opening 3 into which the cap 4 is tightly screwed, and the latter has an extension tube 5 reaching to within a short distance of the bottom of the vessel. The tapping appliance 2 is secured into the cap 4 by means of a thumb screw 7 which slides on the cylindrical part 6 and is held tightly to the face of the cap 4; two rubber rings or washers 8, 9 being used to make joints. A gas channel 10 passes from the inside of the vessel at 11 through the space between the two washers 8, 9 to the filter chamber 12. The carbonic acid gas which is used to discharge the contents of the vessel is compressed and stored in a receptacle (not shown) and connected to the valve 14 by any desired means and is led through the filter 13 to the gas channel 10.

Through the body part 6 extends an outlet passage 15 by which the contents of the vessel are emptied, the inner end seating tightly upon the part $5^a$ of the tube 5, the rubber ring or washer 9 being used to make the joint. By opening the valve 21 and the gas tap 14 any desired quantity of the contents of the vessel may be delivered at the outlet 16 by means of the compressed gas without the remaining contents of the vessel being affected or being brought in contact with anything outside, the pressure in the vessel being always higher than that of the atmosphere. Instead of the valve 21 a cock of any known construction may be used.

Figure 2:
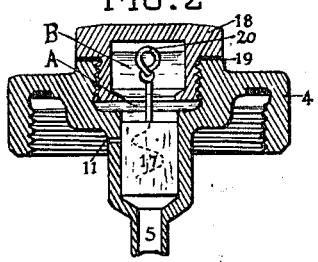
Fig. 2 is a sectional elevation of the means employed for hermetically closing the vessel when it is to be transported from place to place, and before it is tapped.

When the vessel is to be transported with its contents untapped, it is effectively sealed by the device shown in Fig. 2. The tube 5 and the gas passage entrance 11 are closed by means of the cork 17 and the hollow threaded closing plug 18 is screwed into the cap 4 over the cork 17, the packing ring or washer 19 being interposed.

To effectively seal the cork 17, a fluid A as for instance alcohol is poured upon it so as to partly fill the space above it, the fluid being of such a specific gravity that it will float upon the contents of the vessel with which it will not unite. Upon this fluid A is superposed a disinfecting fluid B as for instance oil (olive oil) which is of lighter specific gravity than A, *i. e.* alcohol. If convenient the second fluid may be employed alone. The vessel can thus be moved in any way without affecting the position of the disinfecting fluid or fluids.

When the vessel fitted with this arrangement is to be tapped, it is placed erect, the plug 18 screwed off and the cork 17 slowly withdrawn by means of the wire ring 20. Then the fluid A followed by a disinfecting fluid B as for instance chloroform falls directly upon the beverage in the tube 5.

When the tapping apparatus 2 is secured in the cap 4, the lower part of it passes into the disinfecting fluid, and when it has been screwed up tightly nearly the whole of the disinfectant is forced into the central emptying passage 15 and flows away when the valve 21 is opened, sterilizing the passage on its way out. As an extra precaution the tapping apparatus, when not in use, is stored in alcohol or in some other suitable disinfectant which will kill any germs which may accumulate in the air filter 13.

Figure 3:
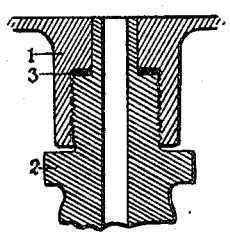
Figs. 3 and 4 are sectional views of a modification when the appliance is used at the bottom of a cask or other vessel, and it is to be understood that by other suitable changes the appliance may be arranged at any other part of the vessel.
Figure 4:
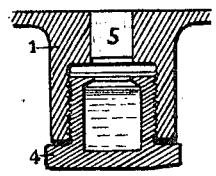

Figs. 3 and 4 show an apparatus by means of which the method according to my invention is carried into practice when the vessel is emptied at the bottom.

Fig. 4 shows the bottom outlet when the vessel is being transported. The lower end is closed by the threaded plug 4 and the upper end by the cork 5.

Fig. 3 shows a construction, the tapping device 2 of which presses the cork 5 into the vessel when connected to the latter. When the vessel is to be tapped the end having the outlet is turned upper most and the plug 4 is screwed off. The tapping device 2 is then screwed half way in through the disinfectant, the vessel is then reversed and the tapping device 2 screwed home tightly into the outlet or bung-hole thus forcing the cork 5 into the vessel.

The disinfectant, the specific weight of which is higher than the contents of the vessel, now lies in the bore of the tapping device 2 and, upon the latter being opened, flows off, first disinfecting the passage on its way.

What I claim is:

1. A method of tapping casks and other vessels which consists in passing the tapping appliance with the end coming in contact with the sterile interior of the cask through a fluid qualified to protect the contents of the cask from being infected from the outside, said fluid being contained in a closure formed in such a manner as to prevent the protecting fluid from spreading over or mixing with the contents of the cask, substantially as described.

2. A method for tapping casks and other vessels which consists in passing the tapping appliance with one end through a fluid qualified to protect the contents of the cask from being infected, said fluid being contained in a closure and qualified to isolate the interior of the cask from the protecting fluid and the atmosphere and adapted to close up the interior automatically, substantially as described.

In testimony whereof I have signed my name to this specification in the presence of two subscribing witnesses.

ARTHUR SCHMID.

Witnesses:
HERMANN HUBER,
ARLON T. ADAMS.

Copies of this patent may be obtained for five cents each, by addressing the "Commissioner of Patents, Washington, D. C."